United States Patent [19]

Annegarn et al.

[11] Patent Number: 4,740,842
[45] Date of Patent: Apr. 26, 1988

[54] VIDEO SIGNAL PROCESSING CIRCUIT FOR PROCESSING AN INTERLACED VIDEO SIGNAL

[75] Inventors: Marcellinus J. J. C. Annegarn; Terence Doyle; Peter H. Frencken; Dirk A. Van Hees, all of Eindhoven, Netherlands

[73] Assignee: U.S. Philips Corporation, New York, N.Y.

[21] Appl. No.: 828,937

[22] Filed: Feb. 12, 1986

[30] Foreign Application Priority Data

Feb. 12, 1985 [NL] Netherlands .......................... 8500379
Jun. 3, 1985 [NL] Netherlands .......................... 8501582
Jan. 8, 1986 [NL] Netherlands .......................... 8600019

[51] Int. Cl.4 .......................... H04N 7/01; H04N 5/21; H04N 7/18
[52] U.S. Cl. .......................... 358/160; 358/105; 358/140; 358/167
[58] Field of Search .......................... 358/105, 140, 181, 160, 358/136, 166, 167

[56] References Cited

U.S. PATENT DOCUMENTS 4,546,386 10/1985 Matsumoto et al. .......... 358/105 X
4,663,665 5/1987 Tanaka et al. .......... 358/140

Primary Examiner—Howard W. Britton
Assistant Examiner—Victor R. Kostak
Attorney, Agent, or Firm—Gregory P. Gadson

[57] ABSTRACT

A movement-adaptive processing circuit for an interlaced video signal has a selection circuit (5) which passes on to its output (21) one of the three video signals applied to its inputs (3, 9, 11) and which signals substantially correspond to three position-sequential lines of two consecutive fields when this signal has an amplitude which is closest to the mean amplitude of these three video signals. The processing circuit may be used many types of circuits such as, for example, in line or field number conversion circuits, noise suppression circuits, DPCM decoding circuits, vertical contour correction circuits and still-picture display circuits of video record players.

16 Claims, 7 Drawing Sheets

VIDEO SIGNAL PROCESSING CIRCUIT FOR PROCESSING AN INTERLACED VIDEO SIGNAL

BACKGROUND OF THE INVENTION

The invention relates to a video signal processing circuit for processing an interlaced video signal, comprising a motion-adaptive selection circuit operable by means of a decision circuit, which selection circuit has three inputs coupled to a video signal source for applying video signals thereto corresponding substantially to three position-sequential lines of two fields, and an output.

A video signal processing circuit of the type described above designed as a line number doubler is known from Radio Mentor Elektronik, No. 5, 1975, page 196. In this circuit a first input of the selection circuit is coupled directly to the video signal source, a second input is coupled to the video source through a delay circuit having a delay of one line period and a third input is coupled to the video source through a delay circuit having a delay of one field period minus half a line period. The output of the selection circuit is coupled through a line number doubler to an input combination of a change-over switch, a further input combination of which is coupled to the video signal source through a further line number doubler. The selection circuit includes an adder circuit coupled to the first and second inputs thereof, while an output of this adder circuit is connected to an input of a change-over switch, a further input of which is coupled to the third input of the selection circuit and an output is coupled to the output of the selection circuit. The changeover switch of the selection circuit is operated by means of a movement detector circuit serving as a decision circuit, which detection circuit compares the video signals of two sequential pictures supplied by the video signal source. The selection circuit which can only be used for the said application serves to obtain lines to be added from the previous field, which lines are located between the original lines of a field in the case of still pictures, or from the same field from the adder circuit serving as an interpolation circuit in the case of moving pictures.

SUMMARY OF THE INVENTION

It is an object of the invention to provide a video signal processing circuit having a different type of selection and decision circuit and resulting in a better picture with fewer disturbing phenomena, which circuit can also be used for many other types of video signal processing operations.

To this end a video signal processing circuit of the type described in the opening paragraph according to the invention is characterized in that the decision circuit has three inputs each coupled to an input of the selection circuit and is arranged for determining at any moment at which input of the selection circuit the amplitude of the video signal applied thereto is closest to the mean value of the amplitudes of the three inputs, while the selection circuit includes a circuit for coupling said input to its output under the influence of the decision circuit.

As a result of this measure the video signal processing circuit is fond to yield a considerable reduction in disturbing phenomena occurring as a result of interlacing, both in moving and in still pictures, and is suitable for all kinds of movement-adaptive signal video processing operations such as, for example, in line number doubling or halving per field and other line number conversions, field number conversions, noise suppression, decoding of differential pulse-modulated signals, still-picture display by means of a video record player and vertical contour correction. Furthermore a picture memory is no longer required for the movement adaptation.

BRIEF DESCRIPTION OF THE DRAWINGS

The invention will now be described with reference to the drawings.

In the drawings.

DETAILED DESCRIPTION OF THE INVENTION

Figure 1:
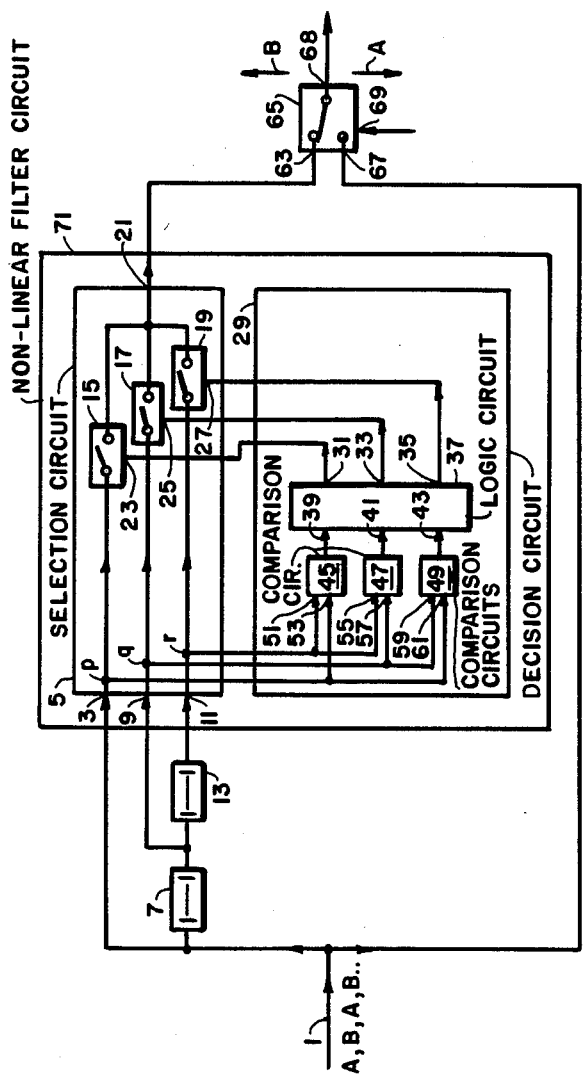
FIG. 1 illustrates with a block diagram a video signal processing circuit according to the invention for use in still-picture display by means of a video record player.

In FIG. 1 a video signal originating from an interlaced still television picture such as, for example, in still-picture display by means of a video record player is applied to an input 1. This video signal is the same from picture to picture, by may differ from field to field. The two fields of a picture are referred to as A and B.

The input 1 is connected to an input 3 of a selection circuit 5 and via a delay circuit 7 having a delay of one field period minus half a line period to an input 9 of the selection circuit 5. An input 11 of the selection circuit 5 is connected to the input 1 via a delay circuit 13 having a delay of one line period and the delay circuit 7.

The inputs 3, 9 and 11 of the selection circuit 5 are connected to an output 21 of the selection circuit 5 via switches 15, 17 and 19, respectively. the switches 15, 17, 19 have operation signal inputs 23, 25 and 27, respectively, constituting an operation signal input combination of the selection circuit 5 and being connected to an operation signal output combination of a decision circuit 29, which operation signal output combination has outputs 31, 33, 35 respectively, of a logic circuit 37.

The logic circuit 37, which may be, for example, a gating circuit or a read-only memory, has three inputs 39, 41, 43 which are also the outputs of three comparison circuits 45, 47, 49. Inputs 51 and 53 of the comparison circuit 45 are connected to the inputs 11 and 3, respectively, of te selection circuit 5. Inputs 55 and 57 of the comparison circuit 47 are connected to the inputs 11 and 9, respectively, of the selection circuit 5 and inputs 59 and 61 of the comparison circuit 49 are connected to the inputs 9 and 3, respectively of the selection circuit 5.

The output 21 of the selection circuit 5 is connected to an input 63 of a change-over switch 65 a further input 67 of which is connected to the input 1 and an output 68 of which constitutes the output of the video signal processing circuit. An operation signal input 69 of the change-over switch 65 receives a switching signal of half the field frequency so that the changeover switch 65 is in the position shown during processing of a video signal from the fields B and is in the position not shown during processing of a video signal from the fields A. A switching signal having the opposite phase yields a comparable result.

The selection circuit 5 and the decision circuit 29 together constitute a non-linear filter circuit 71 by which the signal at one of the inputs 3, 9 or 11 of the selection circuit 5 which is closest to the mean value of the signals at these inputs 3, 9 and 11 is passed on to the output 21.

Signasls p, q and r originating from three superjacent pixels of two consecutive fields are present at the inputs 3, 9 and 11 of the selection circuit 5, in this case with the signal p representing the central pixel from the present field, the signal q representing the lower pixel and the signal r representing the upper pixel from the previous field. When the signals at the inputs 43, 41, 39 of the logic circuit 37 are referred to as x, y and z, respectively, the following Table applies in which $x=0$ for $p>q$ and $x=1$ for $p \leq q$ $y=0$ for $q>r$ and $y=1$ for $q \leq r$ $z=0$ for $r>p$ and $z=1$ for $r \leq p$ and I, II and III denote the desired position of the switches 15, 17 and 19 respectively, of the selection circuit 5 brought about by the signals at the outputs 31, 33 and 35, respectively, of the decision circuit 37 and in which the digit 0 represents the non-closed position and the digit 1 represents the closed position.

| x | y | z | I | II | III |
|---|---|---|---|----|-----|
| 0 | 0 | 0 | d | d  | d   |
| 0 | 0 | 1 | 0 | 1  | 0   |
| 0 | 1 | 0 | 1 | 0  | 0   |
| 0 | 1 | 1 | 0 | 0  | 1   |
| 1 | 0 | 0 | 0 | 0  | 1   |
| 1 | 0 | 1 | 1 | 0  | 0   |
| 1 | 1 | 0 | 0 | 1  | 0   |
| 1 | 1 | 1 | d | d  | d   |

The character d indicates that it does not matter which switch is closed. If a read-only memory is used for the logic circuit 37, it is possible to choose, for example, the switch I for this purpose. When using a gating circuit it is possible to choose the switch I, for example, for $x=y=z=0$ and the switch III may be chosen for $x=y=z=1$, which results in the following logical formulas.

$I = x'z' + xy'z$ $II = x'y'z + xyz'$ $III = yz + zy'z'$ in which a single dash mark denotes an inversion.

When the non-linear filter circuit 71 is used in this manner, flickering effects occurring at the picture frequency are avoided without reducing the number of lines per field period. It is found that a better picture impression is obtained in still-picture display than with any other known circuit.

It will be evident that a single delay circuit having a delay of one field period plus half a line period may alternatively be applied instead of the series arrangement of the delay circuits 7 and 13 between the input 1 and the input 11 of the selection circuit 5.

When the delay circuits 7 and 13 are interchanged, the above-described video signal processing circuit may be used for a reduction in line flicker in the case of conversion of an interlaced to a non-interlaced picture by means of an adaptation of the vertical deflection of the picture display tube from field to field such that an extra vertical deflection over half a line distance of the original field, hence over one picture line distance of the original picture is effected when the change-over switch 65 is in the position B shown.

Figure 2:
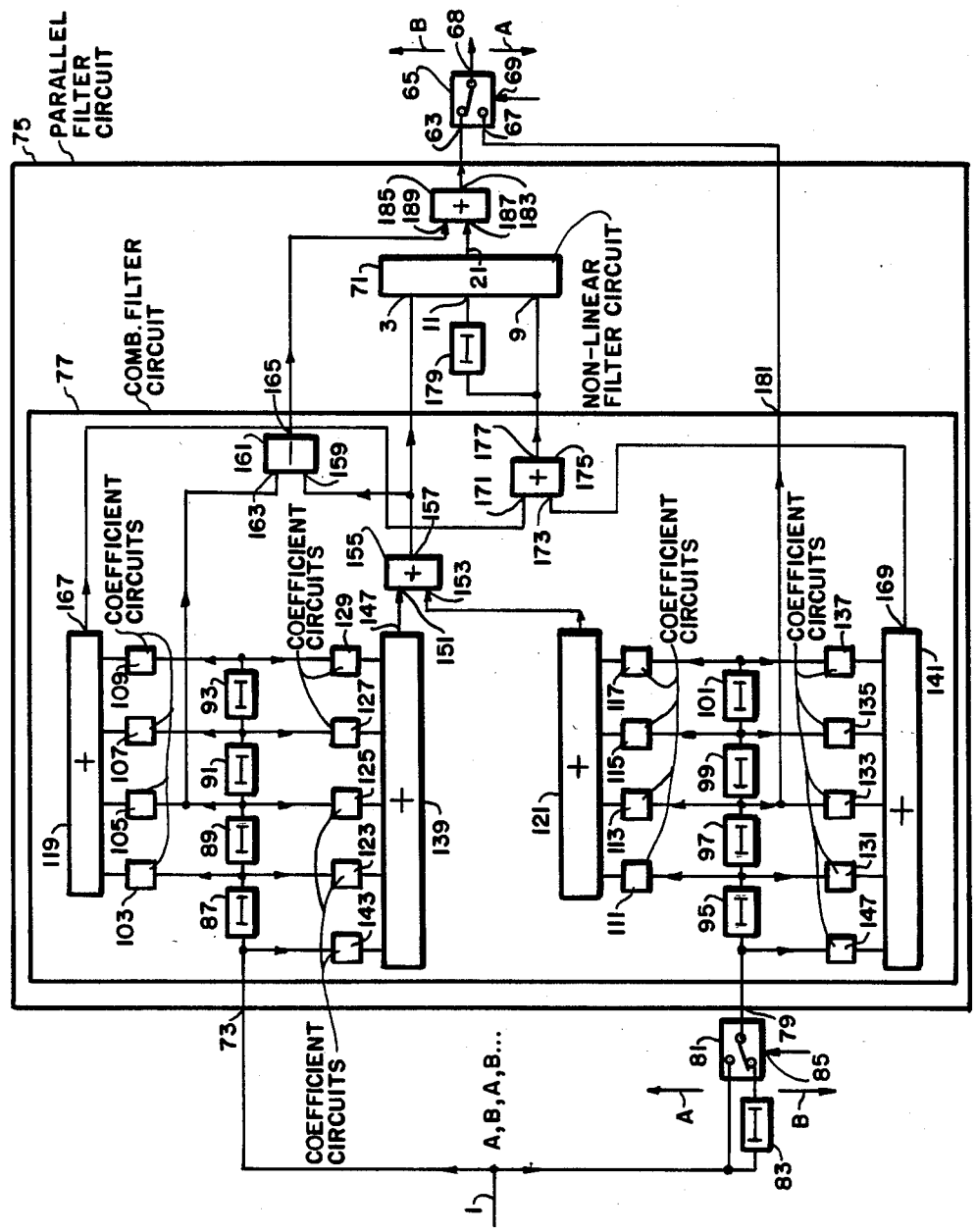
FIG. 2 illustrates with a block diagram a further video signal processing circuit according to the invention for use in still-picture display by means of a video record player.

In FIG. 2 in which corresponding parts have the same reference numerals as in FIG. 1 and to which reference is made for its description, the input 1 is connected to an input 73 of a parallel filter circuit 75. The same signal as in FIG. 1 is applied to the input 1. The input 73 of the parallel filter circuit 75 is also an input of a comb filter circuit 77 forming part of the parallel filter circuit 75. A further input 79 of the parallel filter circuit 75, which is also a further input of the comb filter circuit 77, can be connected through a change-over switch 81 to the input 1 or to an output of a delay circuit 83 having a delay time of one field period minus half a line period whose input is connected to the input 1. The change-over switch 81 is operated by a switching signal of half the field frequency applied to an input 85 thereof, so that the change-over switch 81 assumes the position not shown when a signal from an A field occurs at the input 1 and assumes the position shown when a signal from a B field occurs.

A series arrangement of delay elements 87, 89, 91, 93 and 95, 97, 99, 101 each having a delay of one line period is connected to the inputs 73 and 79, respectively, of the comb filter circuit 77. The outputs of the delay elements 87, 89, 91, 93 and 95, 97, 99, 101 are connected via coefficient circuits 103, 105, 107, 109 and 111, 113, 115, 117 to adder circuits 119 and 121, respectively, and via coefficient circuits 123, 125, 127, 129 and 131, 133, 135, 137 to adder circuits 139 and 141, respectively. Furthermore the inputs of the delay circuits 87 and 95 are connected through coefficient circuits 143 and 145 to the adder circuits 139 and 141, respectively.

Outputs 147 and 149 of the adder circuits 139 and 121 are connected to inputs 151 and 153, respectively, of an adder circuit 155 an output 157 of which is also an output of the comb filter circuit 77 which is connected to the input 3 of the non-linear filter circuit 71 and to an inverting input 159 of a subtractor circuit 161 a non-inverting input 163 of which is connected to the output of the delay element 89 and an output 165 of which constitutes an output of the comb filter circuit 77.

Outputs 167 and 169 of the adder circuits 119 and 141 are connected to inputs 171 and 173, respectively, of an adder circuit 175 an output 177 of which constitutes an output of the comb filter circuit 77 which is directly connected to the input 9 of the non-linear filter circuit 71 and to the input 11 of the non-linear filter circuit 71 through a delay circuit 179 having a delay of one line period.

An output 181 of the comb filter circuit 77, which is also an output of the parallel filter circuit 75, is connected to the output of the delay element 97 and to the input 67 of the change-over switch 65 the input 63 of which is connected to an output 183 of an adder circuit 185, which output 183 is also an output of the parallel filter circuit 77. An input 187 of the adder circuit 185 is connected to the output 21 of the non-linear filter circuit 71 and an input 189 is connected to the output 165 of the subtractor circuit 161.

During the occurrence of the A fields the change-over switches 81 and 65 assume, for example, the position not shown. A signal which is delayed over two line periods relative to the signal at the input 1 is then applied to the output 68 of the change-over switch 65, which signal is further unprocessed.

During the occurrence of the B fields the change-over switches 81 and 65 are in that case in the position shown. The comb filter circuit 77 and the non-linear filter circuit 71 are then operative.

A comb-filtered signal substantially corresponding to a signal from the present field which is delayed over two line periods then appears at the output 157 of the comb filter circuit 77. Simultaneously a comb-filtered signal substantially corresponding to a signal delayed over two line periods from a line of the previous field located just below the line of the present field to which the signal at the output 157 corresponds then appears at the output 177 of the comb filter circuit 77.

Comb-filtered signals substantially corresponding to signals originating from three vertically sequential lines of two consecutive fields are then applied to the inputs 3, 9 and 11 of the non-linear filter circuit 71. In conformity with the description of FIG. 1 these comb-filtered signals are selected by the non-linear filter circuit 71 and applied to the input 187 of the adder circuit 185 the other input 189 of which receives a complementary comb-filtered signal comprising the signal components which have been processed by the non-linear filter circuit 71 and which originate from the output 165 of the subtractor circuit 161.

The following considerations apply for dimensioning the coefficient circuits of the comb filter circuit 77.

When the comb filter circuit 77 is operative, signals from an A and a B field are simultaneously present at its inputs 79 and 73. These two signals may have equally much influence on the signals at the outputs 157 and 177 of the comb filter circuit 77. The coefficient circuits 103, 105, 107, 109 may therefore be chosen to be equal to the coefficient circuits 111, 113, 115, 117, respectively, and the coefficient circuits 143, 123, 125, 127, 129 may be chosen to be equal to the coefficient circuits 145, 131, 133, 135, 137, respectively.

Signal components having a periodicity in the vertical direction corresponding to two picture lines must be passed, signal components having a periodicity in the vertical direction corresponding to three picture lines must be suppressed and signal components having a periodicity in the vertical direction corresponding to more than four picture lies must be passed.

Furthermore, possible signal transients in the vertical direction may not show ringing.

For a comb filter circuit having eight delay elements per delay circuit instead of the four shown for the sake of clarity, the following values are, for example, chosen for the coefficient circuits

| | | | |
|---|---|---|---|
| 143 | 0.0083 | 111 | 0.0014 |
| 123 | −0.0148 | 113 | 0.0089 |
| 125 | 0.0313 | 115 | −0.1120 |
| 127 | 0.1325 | 117 | 0.1155 |
| 129 | 0.6815 | n.d. | 0.1155 |
| n.d | 0.1325 | n.d. | −0.1120 |
| n.d. | 0.313 | n.d. | 0.0089 |
| n.d. | −0.0148 | n.d. | 0.0014 |
| n.d. | 0.0083 | | |

The coefficient circuits that have not been drawn are denoted by n.d. The order from left to right in the circuit corresponds to that from top to bottom in the Table. The input 163 of the subtractor circuit 161 and the input 67 of the change-over switch 65 must now be connected to the output of the delay element 93 and the output of the delay element 101, respectively. In this case the adder circuit 175 supplies a signal substantially corresponding to a signal from the previous field and the adder circuit 155 supplies a signal substantially corresponding to a signal from the present field.

The video signal processing circuit of FIG. 2, likewise as that of FIG. 1, may be used for a reduction in line flicker when the change-over switch 81 is omitted, the input 79 of the parallel filter circuit 75 is connected to the input 1 and the input 73 of the parallel circuit 75 is connected to the output of the delay circuit 83 instead of to the input 1 and when the vertical deflection is corrected to the same manner as is described with reference to FIG. 1.

Figure 3:
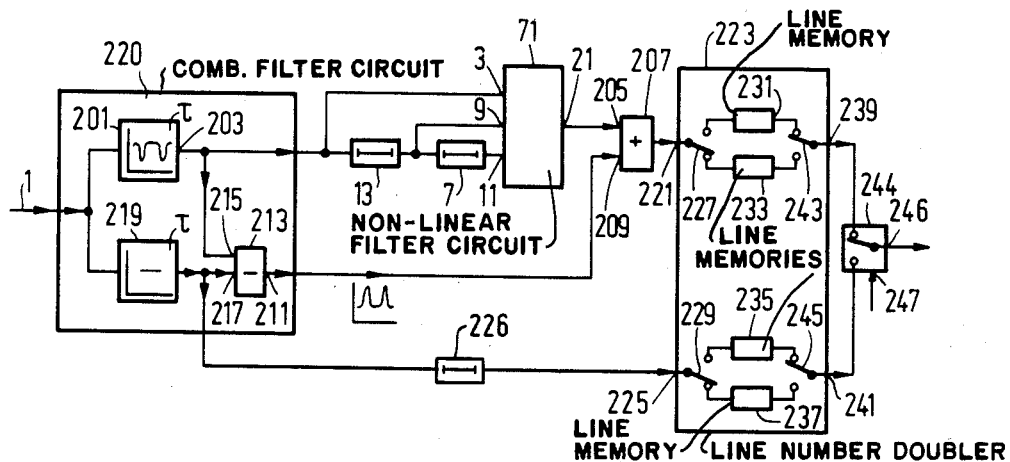
FIG. 3 illustrates with a block diagram a video signal processing circuit according to the invention in which a number of lines is doubled per field.

In FIG. 3 in which corresponding parts have the same reference numerals as in FIG. 1 to which reference is made for a further description, the video signal applied to the input 1 is to be doubled in line number. To eliminate remaining line flicker phenomena in a picture with a video signal doubled in line number, the video signal is first passed through a comb filteer 201. An output 203 of the comb filter 201 then supplies a video signal in which an attenuation occurs for a 625-line picture system at frequencies which are $(n\pm\frac{1}{3})$ times the field frequency and $(m\pm\frac{1}{3})$ times the line frequency $(m=0, 1, 2, \ldots)(n=0, 1, 2, \ldots)$ and particularly at frequencies in the proximity of $(m\pm\frac{1}{3})$ times the line frequency of the video signal which is applied to the comb filter. For systems having a different line number per picture this is the same, apart from the addition to n, which may then be different.

The same considerations as for the comb filter circuit of FIG. 2 apply to the assembly of the comb filter 201. The data mentioned can also be used in this case. The video signal at the output 203 of the comb filter 201 is subsequently applied to the input 3 of the non-linear filter circuit 71 and to the input 9 of the non-linear filter circuit 71 through the delay circuit 13 having a delay of one line period, and furthermore to the input 11 of the nonlinear filter circuit 71 through the delay circuit 7 having a delay of one field period minus half a line period. The output 21 of the non-linear filter circuit 71 then supplies a comb-filtered video signal which is cleared from movement-dependent interferences by the the non-liear filter circuit. This video signal is applied to an input 205 of an adder circuit 207, while complementary comb-filtered video signal is applied to its input 209.

The complementary comb-filtered video signal originates from an output 211 of a subtractor circuit 213 of which an input 215 is connected to the output 203 of the comb filter 201 and an input 217 is connected via an all-pass circuit 219 to the input 1. The all-pass circuit 219 has the same delay time as the comb filter 201. The combination of the comb filter 201, the all-pass circuit 219 and the subtractor circuit 213 will hereinafter be referred to as second comb filter circuit 220.

The adder circuit 207 applies a filtered video signal to an input 221 of a line number doubler 223, which signal represents at any moment from a group of three lines constituted by the two lines from the present field and an interlocated line, that line of which the value of the video signal is closest to the mean value of the video signals of the three lines of said group, while an unfiltered video signal originating from the output of the all-pass circuit 219 is applied to a furtheer input 225 of the line number doubler 223 through a delay circuit 226 having a delay of one field period plus one picture line period.

The line number doubler 223, which is only shown concisely has write switches 227 and 229 connected to the inputs 221 and 225, respectively, four line memories 231, 233, 235, 237 and read switches 243 and 245 connected to outputs 239 and 241, respectively. In the position shown of the switches 227, 229, 243, 245 the line memories 233, 237 are written during a line period of the video signal to be converted and the line memories 231 and 235 are read twice at the double rate. In the subsequent line period of the video signal to be converted the switches 227, 229, 243, 245 assume the position not shown and line memories 231 and 235 are written and line memories 233 and 237 are read twice at the double rate.

Consequently, a video signal of the double line frequency is continuously present at the output 239 of the line number doubler 223, the signal value of the said video signal in a line pair being substantially equal to that signal value of three superjacent lines of two consecutive fields of the video signal at the input 1 which approximates the mean signalvalue of these three lines as closely as possible, while a video signal whose signal value in a line pair is equal to that in a line of the converted unprocessed video signal is continuously present at the output 241.

The outputs 239 and 241 of the line number doubler 223 are alternately connected through a change-over switch 244 to an output 246. To this end the change-over switch 243 receives an operation signal of half the line frequency of the converted video signal at an input 247 so that the output 246 alternately supplies during a line period a converted video signal whose signal value is substantially equal to that signal value of three position-sequential lines of the video signal to be converted, which approximates the mean signal value of these three lines as closely as possible, and during a following line period an unprocessed converted video signal. As a result a video signal of double the line frequency having a very great freedom of interference is obtained without using a movement detector.

The circuit of FIG. 2 will generally be preferred because in the comb filter 201 not only a number of delay circuits having a delay of one line period, but also a delay circuit having a delay of one field period must be used because the signals of the even and odd fields follow the same signal path and signal components producing a picture pattern pattern having a periodicity of three picture lines and having a frequency of $(n\pm\frac{1}{3})$ times the field frequency must also be suppressed.

The circuit of FIG. 3 may be simplified by omitting the comb filter 201, the all-pass circuit 219, the subtractor circuit 213, the delay circuit 226 and the adder circuit 207. The input 3 of the non-linear filter circuit 71 and the input of the delay circuit 13 are then connected to the input 1, and the output 21 of the non-linear filter circuit 71 is connected to the input 221 of the line number doubler 223. For a seldom occurring picture pattern having a periodicity in the vertical direction of three picture lines an extremely slight interference occurring at the picture frequency must then be tolerated.

Figure 4:
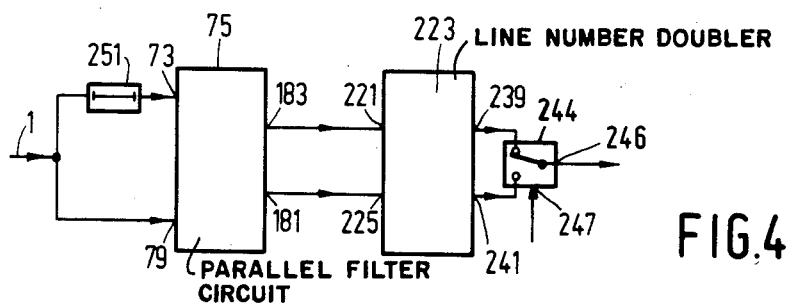
FIG. 4 illustrates with a block diagram a second possible embodiment of a video signal processing circuit according to the invention with which a line number doubling per field is obtained.

FIG. 4 shows a different possible embodiment of a circuit for obtaining a video signal doubled in line number per field, using the parallel filter circuit 75 described in FIG. 2 and the line number doubler 223 described in FIG. 3. Corresponding parts have the same reference numerals as in the foregoing Figures.

In this case the input 1 is directly connected to the input 79 of the parallel filter circuit 75 and through a delay circuit 251 havig a delay of one field period plus half a line period to the input 73 of the parallel filter circuit 75. The outputs 183 and 181 of the parallel filter circuit 75 are conected to the inputs 221 and 225, respectively, of the line number doubler 223. A switching signal of half the line frequency of the converted video signal is then applied to the operation signal input 247 of the change-over switch 246.

Figure 5:
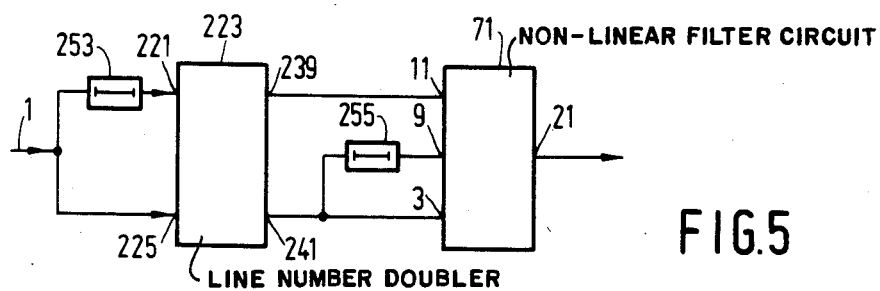
FIG. 5 illustrates with a block diagram a third possible embodiment of a video signal processing circuit according to the invention for a line number doubling per field.

FIG. 5 shows a possible embodiment of a circuit for obtaining a substantially interference-free video signal doubled in line number, incorporating a non-linear filter circuit 71 as described in FIG. 1 after a line number doubler 223 as described in FIG. 3. The input 1 is directly connected to the input 225 and to the input 221 of the line number doubler 223 through a delay circuit 253 having a delay of one field period plus half a line period.

The output 239 of the line number doubler 223 is connected to the input 11 of the non-linear filter circuit 71 and the output 241 fof the line number doubler 223 is connected to the input 3 and through a delay circuit 255 having a delay time of one line period of the converted signal to the input 9 of the non-linear filter circuit 71.

It is found that a change-over switch as in the circuits of FIGS. 3 and 4 is not required because the non-linear filter circuit 71 automatically selects the correct signal to be reproduced.

When a second change-over switch operating with a phase opposed to that of the change-over switch 245 is provided at the outputs of the memories 235, 237 of the line number doubler 223, a signal delayed over two line periods can be derived from this switch. The input of the delay circuit 253 may then receive this signal delayed over two line periods instead of the signal from the input 11 and the delay time of the delay circuit 253 may be decreased by two line periods. The memories 235, 237 may be serial memories which are written with their output signal during the accelerated reading.

Figure 6:
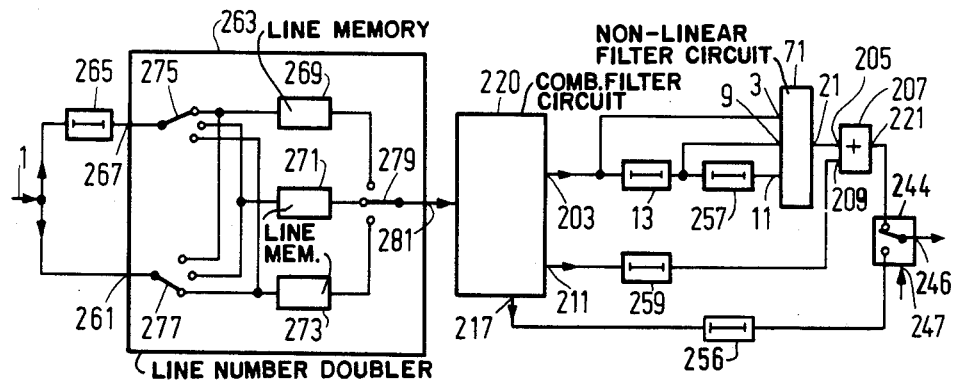
FIG. 6 illustrates with a block diagram a fourth possible embodiment of a video signal processing circuit according to the invention for obtaining a line number doubling per field.

FIG. 6 shows a variant of the circuit of FIG. 3 in which a line number doubler is incorporated in front of the second comb filter circuit 220 instead of behind the adder circuit 207. Corresponding parts have the same reference numerals as in FIG. 3. The change-over switch 244 now switches between the output of the adder circuit 207 and a delay circuit 256 having a delay of one line period of the converted signal connected to the output 217 of the all-pass circuit 219 of the second comb filter circuit 220. The input 11 of the non-linear filter circuit 71 now is connected via a delay circuit 257 having a delay of one line period of the converted signal to the output of the delay circuit 13 which in this case has a delay of one line period of the converted signal, while the input 209 of the adder circuit 207 is connected via a delay circuit 259 having a delay of line period of the converted signal is connected to the output 211 of the second comb filter circuit 220.

The input 1 of the circuit is connected to an input 261 of a line number doubler 263 and to an input 267 thereof via a delay circuit 265 having a delay of one field period.

The line number double 263 has three line memories 269, 271, 273, whose inputs can be connected through two write switches 275, 277 to the input 267 or 261 and whose outputs can be connected through a read switch 279 to an output 281 of the line number doubler 263.

The output 281 of the line number doubler 263 is connected to the input of the second comb filter circuit 220.

In this case the second comb filter circuit 220 only comprises delay elements having a delay of one line period, and if desired, it may alternatively be designed as a recursive filter, for example, as a digital wave filter having only two delay elements.

Figure 15:
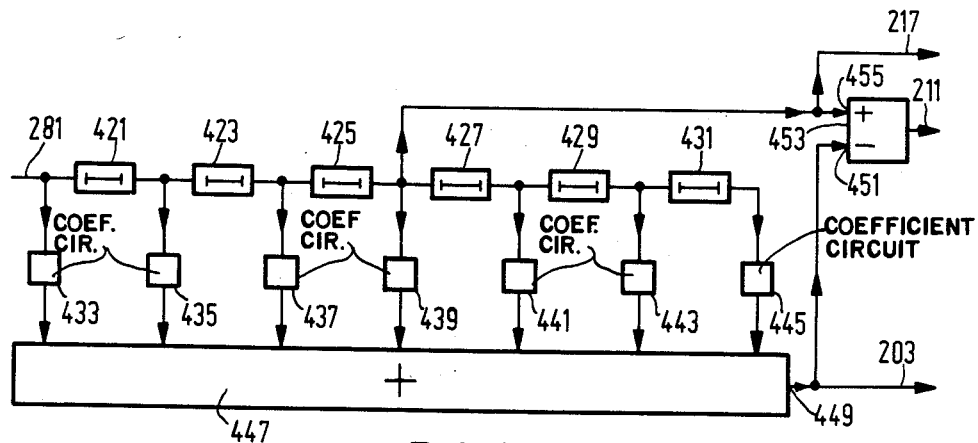
FIG. 15 illustrates with a block diagram a possible embodiment of a second comb filter circuit for use in the line number doubler of FIG. 6.

An example of such a comb filter circuit designed as a transversal filter is shown in FIG. 15.

The write and read switches 275, 277, 279 are operated in such a rhythm that lines of the signal at the input 261 and of the signal at the input 267 are alternately written in a different line memory, while between two write periods each memory is read at the double rate during half a line period of the signal to be converted. A line from the present field, a line from the previous field, a second line from the present field, a second line from the previous field, a third line from the present field and so forth then successively occur at the output 281.

As a result video signals substantially originating from a line from the present field and from the previous field are alternately available at the outputs 203 of the second comb filter circuit 220, and this in the order in which they are positioned in a picture so that substantially the video signals from three position-sequential lines from two fields are presented at the inputs 3, 9 and 11 of the non-linear filter circuit 71.

A switching signal of half the line frequency of the converted video signal is now applied to the change-over signal input 247 of the change-over switch 244 so that alternately a video signal of a line from the present field and substantially of a non-linear filtered signal of three consecutive lines of two fields is obtained at the output 246 of the change-over switch 244.

If desired, the second comb filter circuit 220 may be omitted. The adder circuit 207 and the delay circuits 256 and 259 are then also omitted, while the input 3 of the non-linear filter circuit 71 and that of the delay circuit 13 are then connected to the output 281 of the line number doubler 263 and the change-over switch 244 is then to switch between the output 21 and the input 9 of the nonlinear filter circuit 71.

The delay circuit 265 and the line number doubler 263 can be replaced by the circuit shown in FIG. 4 in which the comb filter circuit 75 is omitted and the input 221 of the line number doubler 223 is connected to the output of the delay circuit 251 and the input 225 of the line doubler circuit 223 is connected to the input 1.

Figure 7:
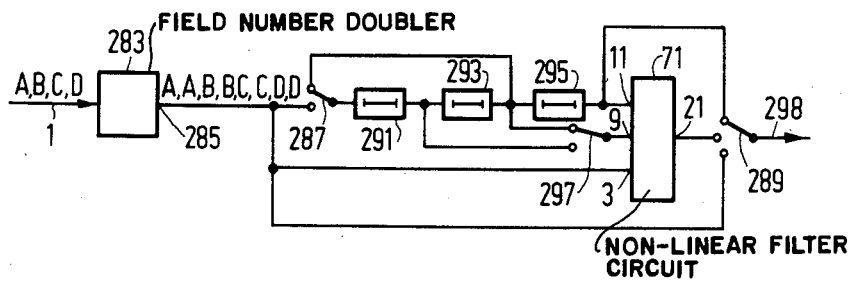
FIG. 7 illustrates with a block diagram a video signal processing circuit according to the invention for field number doubling.

In the video signal processing circuit of FIG. 7 in which the same reference numerals have been used for corresponding parts as in the previous Figures, a non-linear filter circuit 71 described in FIG. 1 is used in an interpolation circuit incorporated after a field number doubler 283.

An interlaced video signal whose fields have been mentioned A, B, C, D, E, . . . , is applied to the input 1 which is also the input of the field number doubler 283. The fields A, C, . . . cover one field period plus half a line period during doubling, the fields B, D, . . . cover one field period minus half a line period. A video signal whose field frequency is doubled and in which each field of the input signal occurs twice in succession is then available at an output 285 of the field number doubler 283. This video signal is here referred to as A, A, B, B, C, C, D, D. This video signal is applied to the input 3 of the non-linear filter circuit 71, to a change-over switch 287 and to a first input of a change-over switch 289.

The output of the change-over switch 287 is connected through a series arrangement of delay circuits 291, 293, 295 to the input 11 of the non-linear filter circuit 71. The other input of the change-over switch 287 is connected to the connection between the delay circuits 293 and 295. The delay circuits 291, 293 and 295 have delay times of one line period, one field period minus one and a half line periods of one line period, respectively, of the converted video signal.

The input 9 of the non-linear filter circuit 71 can be connected via a change-over switch 297 to the connection between the delay circuits 291, 293 or to that between the delay circuits 293, 295. Furthermore the input 11 of the non-linear filter circuit 71 is connected to a second input of the change-over switch 289 a third input of which is connected to the output 21 of the non-linear filter circuit 71. The output 298 of the change-over switch 289 constitutes the output of the circuit.

The circuit including the change-over switches 287, 289, 297, the delay circuits 291, 293, 295 and the non-linear filter circuit 71 replaces an interpolation circuit and provides a better interference suppression than the known interpolation circuits.

The change-over switches are to be operated as follows. When the group of fields A, B, B, C is referred to as a switching cycle which is periodically repeated for the subsequent groups of four fields C, D, D, E; E, F, F, G and so forth and in which four switching intervals referred to as one, two, three and four occur every time, the change-over switch 287 is to be in the position shown in the intervals two and four, the change-over switch 297 is to be in the upper position shown in the interval two. Furthermore the change-over switch 289 is to be in the central position not shown in the intervals two and three, in the uppeer position shown in the interval four and in the lower position not shown in the interval one. In the intervals one and three the change-over switch 287 is to be in the position not shown and the change-over switch 297 is to be in the position not shown in the interval three. During the intervals one and four the position of the change-over switch 297 is not important because the change-over switch 289 is then in its upper or lower position and the output signal of the circuit is not obtained from the non-linear filter circuit 71.

Due to the operation of the change-over switch 287 a cycle A, A, B, B which is thus delayed over approximately one field period of the original signal relative to the cycle B, B, C, C becomes available in this cycle B, B, C, C at the input 11 of the non-linear filter circuit 71.

The change-over switch 297 ensures that a signal is available at the input 9 of the non-linear filter circuit 71, which signal is delayed over one line period during the interval three with respect to the signal at the input 3 and which occurs one line period earlier during the interval two with respect to the signal at the input 11. As a result three position-sequential lines from two consecutive fields become available at the inputs 3, 9 and 11 of the non-linear filter circuit 71 during the intervals two and three, two lines from the field A and an interlocated line from the field B occur in the interval two and two lines from the field B and an interlocated line from the field A occur in the interval three. In these intervals two and three the non-linear filter circuit 71 is therefore operative in the output signal because the change-over switch 289 is then in its central position.

In a first cycle a signal from the field A in the interval one, a non-linear filtered signal from three consecutive lines from the fields A and B in the intervals two and three and a signal from the field B in the interval four become available at the output 298. In the further cycles A is replaced by C and B by D and so forth.

The change-over switch 289 may be omitted when the change-over switch 297 is extended by two positions so that the input 9 of the non-linear filter circuit 71 is interconnected to the input 11 of the non-linear filter circuit 71 during the interval four and to the input 3 of the non-linear filter circuit 71 during the interval one.

Figure 8:
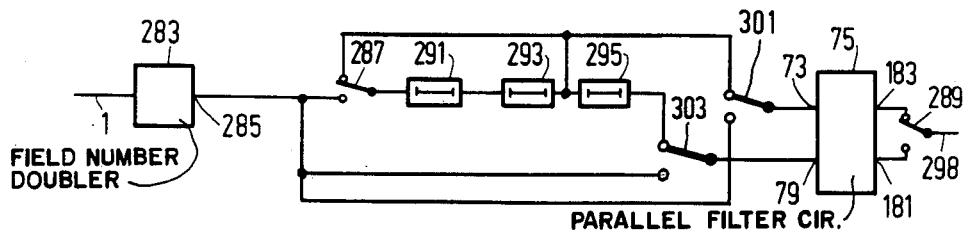
FIG. 8 illustrates with a block diagram of a further video signal processing circuit according to the invention for field number doubling.

FIG. 8 shows how the video signal processing circuit of FIG. 7 is to be adapted when a parallel filter circuit 75 as described in FIG. 2 is used. Corresponding parts have the same reference numerals as in the previous Figures.

In this case the change-over switch 289 has only two positions and its inputs are connected to the outputs 183 and 181 of the parallel filter circuit 75. In the intervals one and four the change-over switch 289 is in the lower position not shown and the output 298 is connected to the output 181 of the parallel filter circuit 75 from which it receives a non-processed delayed signal. In the upper position shown of the change-over switch 289, which position is to be assumed in intervals two and three, the output 298 is connected to the output 183 of the parallel filter circuit 75 and receives a comb-filtered signal processed by the non-linear filter circuit 71 of the parallel filter circuit 75.

The input 73 of the parallel filter circuit 75 is connected through a change-over switch 301, which is in the position not shown in the interval three, to the output 285 of the field number doubler 283 in this interval three and in the interval two, in which the change-over switch 301 is in the position shown, it is connected to the output of delay circuit 293. Since the signal at the input 73 of the parallel filter circuit 75 is not processed in the output signal during the intervals one and four, the position of the change-over switch 301 in these intervals one and four is not important.

The input 79 of the parallel filter circuit 75 is connected through a change-over switch 303 in the intervals one and two, in which the position not shown is assumed, to the output 285 of the field number doubler 283 and in the intervals three and four, in which the position shown occurs, it is connected to the output of the delay circuit 295.

Figure 9:
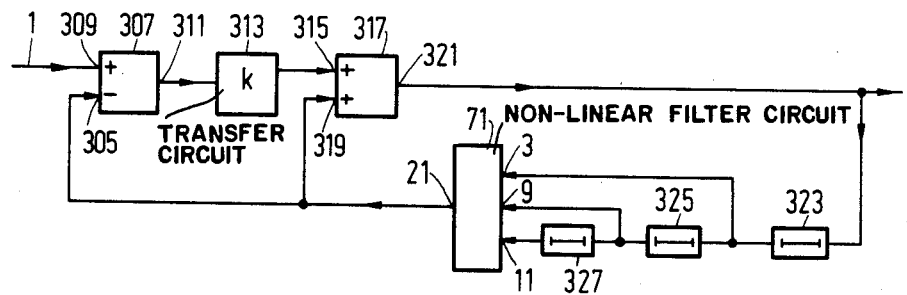
FIG. 9 illustrates with a block diagram a video signal processing circuit according to the invention for obtaining noise suppression.

FIG. 9 shows a noise suppression circuit for a video signal applied to an input 1 in which a non-linear filter circuit 71 as described in FIG. 1 is used. The output 21 of this non-linear filter circuit 71 is connected to an inverting input 305 of a subtractor circuit 307 whose non-inverting input 309 receives the video signal originating from the input 1. An output 311 of the subtractor circuit 307 is connected through a transfer circuit 313 having a transfer factor of k which may be, for example, movement dependent in a known manner to an input 315 of an adder circuit 317, a further input 319 of which is also connected to the output 21 of the non-linear filter circuit 71.

An output 321 which also constitutes the output of the circuit is connected through a delay circuit 323 having a delay of one field period minus half a line period to the input 3 of the non-linear filter circuit 71 and to an input of a delay circuit 325 having a delay of one line period and whose output is connected to the input 9 of the non-linear filter circuit 71 and to the input of a delay circuit 327. The delay circuit 327 has a delay of one field period minus half a line period and an output thereof is connected to the input 11 of the non-linear filter circuit 71.

The non-linear filter circuit 71 then automatically passes one of its three input signals that is most suitable for the most favorable noise suppression.

If so desired, a comb filter circuit 220 and an adder circuit 207 may be included, as shown in FIG. 3, between the output of the delay circuit 323 and the interconnected inputs 305 and 329 of the subtracting circuit 307 and the adder circuit 317.

Figure 10:
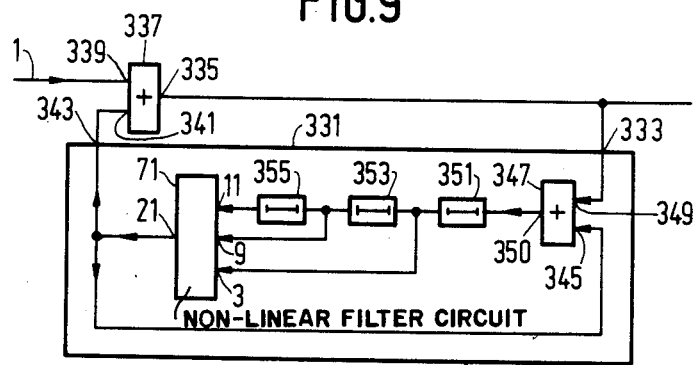
FIG. 10 illustrates with a block diagram of a video signal processing circuit according to the invention for differential pulse code modulation and demodulation.

In FIG. 10 the non-linear filter circuit 71 is used in a DPCM decoder 331, an input 333 of which is connected to an output 335 of a quantizing subtractor circuit 337, a non-inverting input 339 of which is connected to the input 1, and an inverting input 341 is connected to an output 343 of the decoder 331 so that a DPCM encoder is constituted. Corresponding parts have the same reference numerals as in the previous Figures.

The output 343 of the decoder 331 is connected to the output 21 of the non-linear filter circuit 71 which applies its output signal also to an input 345 of a dequantizing adder circuit 347 a further input 349 of which is connected to the input 333 of the decoder 331.

An output 350 of the dequantizing adder circuit 347 is connected through a delay circuit 351 having a delay of one field period minus half a line period to the input 3 of the non-linear filter circuit 71 and to the input of a delay circuit 353 having a delay of one line period whose output is connected to the input 9 of the non-linear filter circuit 71 and to the input of a delay circuit 355. The delay circuit 355 has a delay of one field period minus half a line period and its output is connected to the input 11 of the non-linear filter circuit 71.

The quantizing subtractor circuit 337 supplies a code for each incoming sample of the video signal, which code corresponds to a value dependent on the difference in amplitude between the video signal at the output 343 of the decoder 331 and the amplitude of the video signal sample at the input 1.

The decoder 333 is an integrator circuit in which the value of the code is added to a value of a video signal sample whose position in the picture substantially corresponds to the position in the picture of the sample at the input 1. The most suitable position yielding the most accurate result for integration is then determined by the non-linear filter circuit 71.

Figure 11:
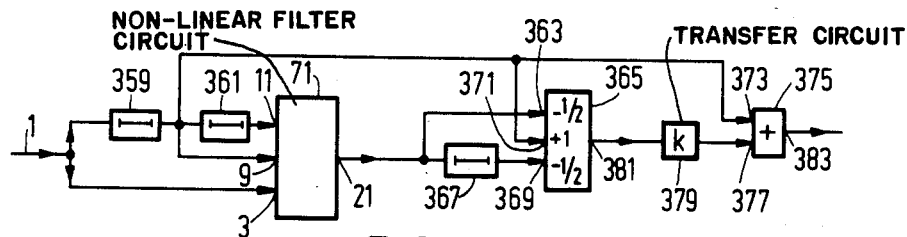
FIG. 11 illustrates with a block diagram a video signal processing circuit according to the invention for obtaining vertical contour correction.

In FIG. 11 the same reference numerals have been used as in the previous Figures for corresponding parts. The input 1 is connected to the input 3 of the non-linear filter circuit 71 whose input 9 is connected through a delay circuit 359 to the input 1 and the input 11 is connected through a delay circuit 361 to the output of the delay circuit 359. The delay circuit 359 has a delay of one line period, the delay circuit 361 has a delay of one field period minus half a line period. The non-linear filter circuit 71 therefore receives a video signal of two lines from the present field and an interlocated line from the previous field and passes on at any moment the value closest to the mean value of these three video signals to its output 21. The output 21 of the non-linear filter circuit 71 is connected to an input 363 of an adder and subtractor circuit 365 and to a further input 369 thereof through a delay circuit 367 having a delay of one line period. A third input 371 of the adder and subtractor circuit 365 is connected to the output of the delay circuit 359 which is furthermore connected to an input 373 of an adder circuit 375. A further input 377 of this adder circuit 375 is connected to an output 381 of the adder and subtractor circuit 365, through a transfer circuit 379 having a, possibly controllable, transfer factor of k. An output 383 of the adder circuit 375 constitutes the output of the circuit serving as a vertical contour correction circuit.

Of the video signals applied to the inputs of the adder and subtractor circuit 365 half the sum of the signals at the inputs 363 and 369 is subtracted from the signal at the input 371 and this difference is passed on to the output 381. This half sum is the mean value of the values closest to the mean values in the two consecutive line periods of the video signals of three vertically sequential line, the signal corresponding to the central line being applied to the input 371 of the addeer and subtractor circuit 365. The signal at the output 381 of the adder and subtractor circuit 365 produces a transient correction signal through the transfer circuit 379 at the input 377 of the adder circuit 375, which signal is added to the signal of the central line applied to the input 373 so that a contour correction which is as favorable as possible at any moment is obtained.

Figure 12:
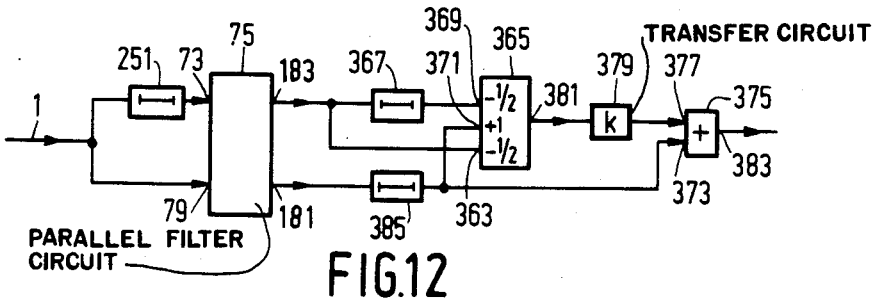
FIG. 12 illustrates with a block diagram a further video signal processing circuit according to the invention for vertical contour correction.

FIG. 12 shows how the vertical contour correction circuit of FIG. 11 is to be adapted when the parallel filter circuit 75 of FIG. 4 and FIG. 2 is used. Corresponding parts have the same reference numerals as in the previous Figures to which reference is made for their further description.

The input 363 of the adder and subtractor circuit 365 connected to the input of the delay circuit is now connected to the output 183 of the parallel filter circuit 75, while the input 373 of the adder circuit 375 connected to the input 371 of the adder and subtractor circuit 365 is connected to the output 181 of the parallel filter circuit 71 through a delay circuit 385 having a delay of one line period. The latter delay circuit 385 may be omitted, if desired, when the branch to the output 181 on the relevant comb filter in the parallel filter circuit 75 is taken one line period later.

Figure 13:
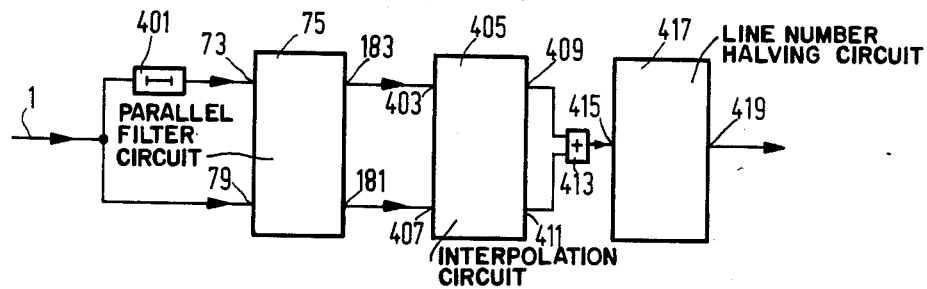
FIG. 13 illustrates with a block diagram a possible embodiment of a video signal processing circuit according to the invention for halving the number of lines per field.

In FIG. 13 in which corresponding parts have the same reference numerals as in the previous Figures to which reference is made for their further description, an interlaced video signal whose line number per field is to be virtually halved, for example, from 624.5 to 312.5 is applied to the input 1. This signal is applied through a delay circuit 401 having a delay of one field period plus half a line period of the video signal to be converted to the input 73 of the parallel filter circuit 75 described with reference to FIG. 2.

The output 183 of the parallel filter circuit 75 applies a filtered video signal to an input 403 of an interpolation circuit 405. The output 181 of the parallel filter circuit 75 applies a non-processed video signal to an input 407 of the interpolation circuit 405, which signal has a delay adapted to the delay of the video signal at the input 403.

The interpolation circuit 405 is structurally equal to the comb filter circuit 77 of FIG. 2 without the subtractor circuit 61 and the outputs 165 and 181, and has for its object to suppress frequency components of more than 312 periods per picture height. The coefficients of the coefficient circuits 143, 111, 123, 113, 125, 115, 127, 117 and 129 may have, for example, the values 0, 0, $-\frac{1}{8}$, $\frac{1}{4}$, $\frac{3}{4}$, $\frac{1}{4}$, $-\frac{1}{8}$, 0 and 0, respectively. The values of the coefficients of the coefficient circuits 145, 103, 131, 105, 133, 107, 135, 109 and 137 are equal thereto.

The interpolation circuit 405 has outputs 409 and 411 corresponding to the outputs 157 and 177, respectively, of the comb filter circuit 77 of FIG. 2. Each of these outputs 409 and 411 is connected to an input of an adder circuit 413 an output of which is connected to an input 415 of, for example, a known line number halving circuit 417, an output of which supplies the desired signal with a great freedom from interference.

Figure 14:
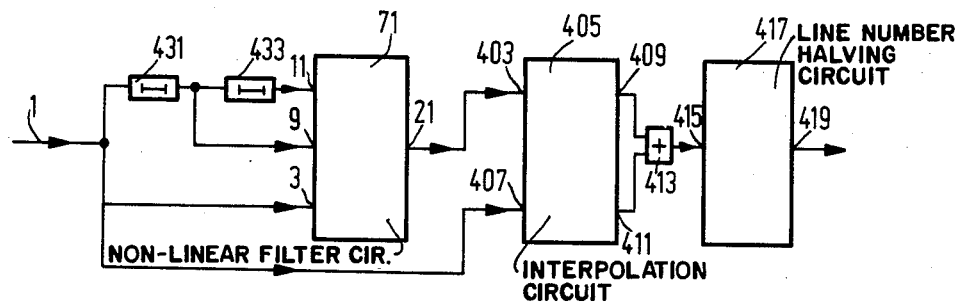
FIG. 14 illustrates with a block diagram a further possible embodiment of a video signal processing circuit according to the invention for halving the number of lines per field.

FIG. 14, in which corresponding parts have the same reference numerals as in the previous Figures and to which reference is made for their further description, shows a simplified embodiment of the circuit of FIG. 13. The input 407 of the interpolation circuit 405 in this case is connected to the input 1 of the circuit which is also connected to the input 3 of the non-linear filter circuit 71 described with reference to FIG. 1. The input 9 of the non-linear filter circuit 71 is connected to an output of a delay circuit 431 having a delay of one line period and to which also an input of a delay circuit 433 having a delay of one field period minus half a line period is connected whose output is connected to the input 11 of the non-linear filter circuit 71.

FIG. 15 shows a possible embodiment of the second comb filter circuit 220 for use in the circuit of FIG. 6. A series arrangement of delay elements 421, 423, 425, 427, 429 and 431 each having a delay of one line period is connected to the input 281. The inputs and outputs thereof are connected through coefficient circuits 433, 435, 437, 439, 441, 443 and 445 to an adder circuit 447, an output 449 of which is connected to the output 203 and to an inverting input 451 of a subtractor circuit 453, a non-inverting input 455 of which is connected to the output of the delay element 425 which is further connected to the output 217. The output of the subtractor circuit 453 is connected to the output 211 of the comb filter circuit.

Figure 16:
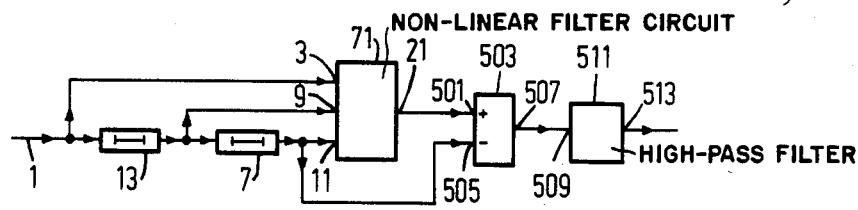
FIG. 16 illustrates with a block diagram a possible embodiment of a video signal processing circuit according to the invention, arranged as a movement detector.

In FIG. 16, in which components corresponding to those of the preceding Figures, have been given the same reference numerals, the output 21 of the non-linear filter circuit 71 is connected to an input 501 of a subtracting circuit 503, a further input 505 of which is connected to the input 11 of the non-linear filter circuit 71.

An output 507 of the subtracting circuit 503 than applies a movement indication signal to an input 509 of a high-pass filter 511 from an output 513 of which a signal is obtained which is motion-dependent but has substantially zero value when a stationary vertical transient occurs in the picture, so that this transient is not detected as movement.

If the circuit is used subsequent to a line number doubler, for example the doubler shown in FIG. 6, then the delay circuit 7, which in the Figure produces a delay of one field period minus half a line period is replaced by a delay circuit producing a delay of a line period and the input 505 of the subtracting circuit 503 is connected to the input 9 of the non-linear filter circuit 71.

Figure 17:
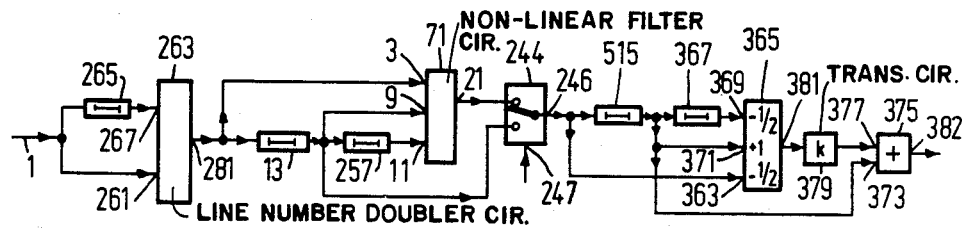
FIG. 17 illustrates with a block diagram a possible embodiment of a video signal processing circuit according to the invention including a line number doubler, a non-linear filter circuit and a vertical contour correction circuit.

In FIG. 17 components corresponding to those in the preceding Figures have been given the same reference numerals. A line number doubler circuit 265, 263 is followed by a non-linear filter circuit 13, 257, 71 as described with reference to FIG. 6. That input of the change-over switch 244 not connected to the output of the non-linear filter circuit 71 is here connected to the input 9 of the non-linear filter circuit 71.

The output 246 of the change-over circuit 244 is connected to the input 363 of the adder-and-subtracting circuit 365 and to an input of a delay circuit 515 producing a delay of one line period, whose output is connected to the input of the delay circuit 367, to the input 371 of the adder-and-subtracting circuit 365 and to the input 373 of the adder circuit 375.

The line number doubler and filter circuits preceding the input of the delay circuit 515 and the input 363 of the adder-and-subtracting circuit 365 may, if so desired be replaced by those of FIGS. 3, 4, 5 or 6.

Figure 18:
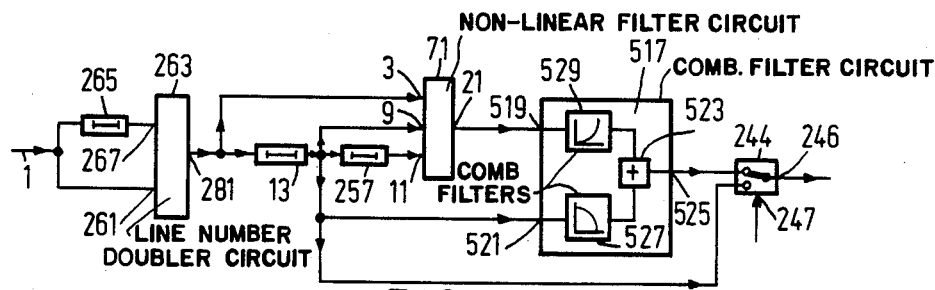
FIG. 18 illustrates with a block circuit diagram a video signal processing circuit according to the invention, in which a comb filter circuit is included subsequent to a non-linear filter circuit and a line number doubler.

In FIG. 18, in which components corresponding to those of the preceding Figures have been given the same reference numerals, it is shown how in a combination of a line number doubler 265, 263 a non-linear filter circuit 71 and a comb filter circuit 517, this comb filter circuit can be arranged subsequent to the non-linear filter circuit. This renders it possible to design the comb filter circuit such that, independently of each other, the transient response and the suppression of the unwanted signal components resulting from the non-linear operation, can be rendered as advantageous as possible.

The comb filter circuit 517 is a complementary circuit and has two complementarily filtering signal paths from two inputs 519, 521 to a combining circuit 523 which in this case is in the form of an adder circuit, an output 525 of which is connected to one of the inputs of the change-over switch 244. The respective inputs 519 and 521 of the complementary comb filter circuit 517 are connected to the output 21 and the input 9, respectively of the non-linear filter circuit 71.

For clarity's sake the drawing shows the complementary comb filter circuit 517 with two comb filters 527, 529. Each of these filters may be implemented as shown in FIG. 15, the subtracting circuit 453 and the output 217 then being omitted.

For an advantageous structure the coefficients can be chosen as follows:

| Coefficient | Filter 527 | Filter 529 |
| --- | --- | --- |
| 433 | +0.0625 | −0.0625 |
| 435 | −0.1975 | +0.1875 |
| 437 | +0.1875 | −0.1875 |
| 439 | +0.8750 | +0.1250 |
| 441 | +0.1875 | −0.1875 |
| 443 | −0.1875 | +0.1875 |
| 445 | +0.0625 | −0.0625 |

Thus, the requirements to be imposed on the comb filter 529 are satisfied. These requirements are: the attenuation of the frequencies of a number of periods per picture height in the region of one third of the number of picture lines, caused by the non-linear filter 71, must be corrected, as must also the 180° phase shift then occurring, the phase characteristic must be linear, at frequencies of a number of periods per picture height equal to half the number of picture lines the attenuation must be at its maximum, the d.c. current transfer must be equal to unity and the frequency characteristic for frequencies near zero periods per picture height must be as flat as possible.

If the number of delay lines and coefficients of the comb filter 529 are increased, then the frequency characteristic can be kept flatter to near the frequency corresponding to half the number of picture lines per picture height and the attenuation at that frequency can be increased, which is advantageous for still pictures. For moving pictures the described composition is an advantageous composition.

One of the comb filters 527 or 529 can be replaced by a delay circuit when the relevant, respective, inputs 521 and 519 of the complementary comb filter circuit and the further, respective, inputs 519 and 521 are connected to the input of the comb filters 529 and 527, respectively, via a subtracting circuit. Depending on the sign of the transfer from each input to the output of the relevant subtracting circuit, the combining circuit 523 must be either an adder or a subtracting circuit.

The line doubler and non-linear filter circuit 285, 263, 13, 157, 71 can be replaced by the line number doubler and non-linear filter circuit 253, 223, 255, 71 of FIG. 5. The input 521 of the complementary comb filter circuit 517, connected to the relevant input of the change-over switch 244 must then be connected to the input 3 of the non-linear filter circuit 71.

When the complementary comb filter circuit 517 is of the structure as shown in the Figure, the comb filter 527 may, if so desired, be structured such that in addition, a vertical contour correction is obtained. The lower input of the change-over switch 244 must then be connected to the output of the comb filter 527.

Figure 19:
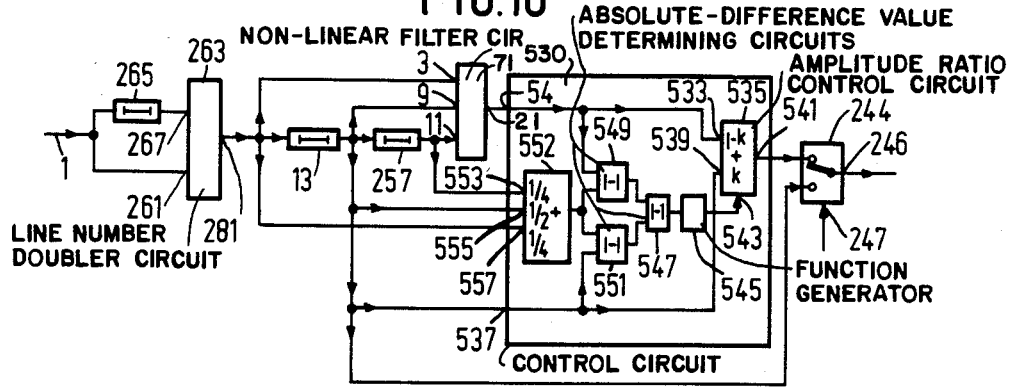
FIG. 19 illustrates with a block diagram a video signal processing circuit according to the invention having a control circuit arranged between the output and the input circuit of a non-linear filter circuit.

In FIG. 19, in which components corresponding to those shown in the preceding Figures have been given the same reference numerals, it is shown that a control circuit 530 can be substituted for the complementary comb filter 517 of FIG. 18.

A video signal is applied from the output 21 of the non-linear filter circuit 71 to an input 533 of an amplitude ratio control circuit 535 via an input 531 of the control circuit 530. The video signal at the input 9 of the non-linear filter circuit 71 is applied via an input 537 of the control circuit 530 to a further input 539 of the amplitude ratio control circuit 535. An output 541 of the amplitude ratio control circuit 535 is connected to the upper input of the change-over switch 244.

A control signal input 543 of the amplitude ratio control circuit 535 is connected to an output of a function generator 545, which may be in the form of a programmable read-only memory (PROM). The function generator 545 receives a signal from an output of an absolute-difference value determining circuit 547 whose inputs are connected to the outputs of two absolute-difference value determining circuits 549 and 551, which determine the absolute difference value between the signals at the input 531 and 537, respectively of the control circuit 530 and the output signal of an averaging circuit 552 whose inputs 553, 555, 557 are connected to the respective inputs 11 and 9, 3 of the non-linear filter circuit 71.

Obtaining the control signal for the amplitude ratio control circuit 535 is based on the following considerations. The non-linear filter circuit 71 attenuates frequencies whose number of periods per picture height is approximately equal to one third of the number of lines per picture to the highest possible extent and then produces the highest degree of distortion. The energy transfer is at its lowest at those frequencies. A measure of this frequency transfer can be obtained using the absolute-difference value determining circuits 549, 551 and 547. When the energy transfer from the non-linear filter 71 is low, the transfer factor k from the input 539 to the output 541 of the amplitude ratio control circuit 535 must be made large by the control signal at the input 543 thereof, so that a non-distorted signal transfer is effected. When the energy transfer is great, then the transfer factor k is made small and the transfer 1-k from the input 533 to the output 541 of the amplitude ratio control circuit 535 becomes large, so that the non-linear filter 71 is thus made operative.

If so desired, a change-over switch can be used instead of a continuously controllable amplitude ratio control circuit 535.

The function generator 545 can provide a control behavior adapted to the user's wishes and a threshold action.

The remarks made in the description with reference to FIG. 18 on the possible use of a different line number doubler circuit also hold here.

The control circuit 530 can also be used in other applications of the non-linear filter 71 when invariably the video signal corresponding to the central line of three consecutive picture lines is applied to the input 555 of the averaging circuit 552 and to the input 537 of the control circuit 530. The averaging circuit 552 has, as is shown in the picture, a transfer factor equal to one fourth from its inputs 553 and 557 to its output and equal to one half from its input 535 to its output.

Figure 20:
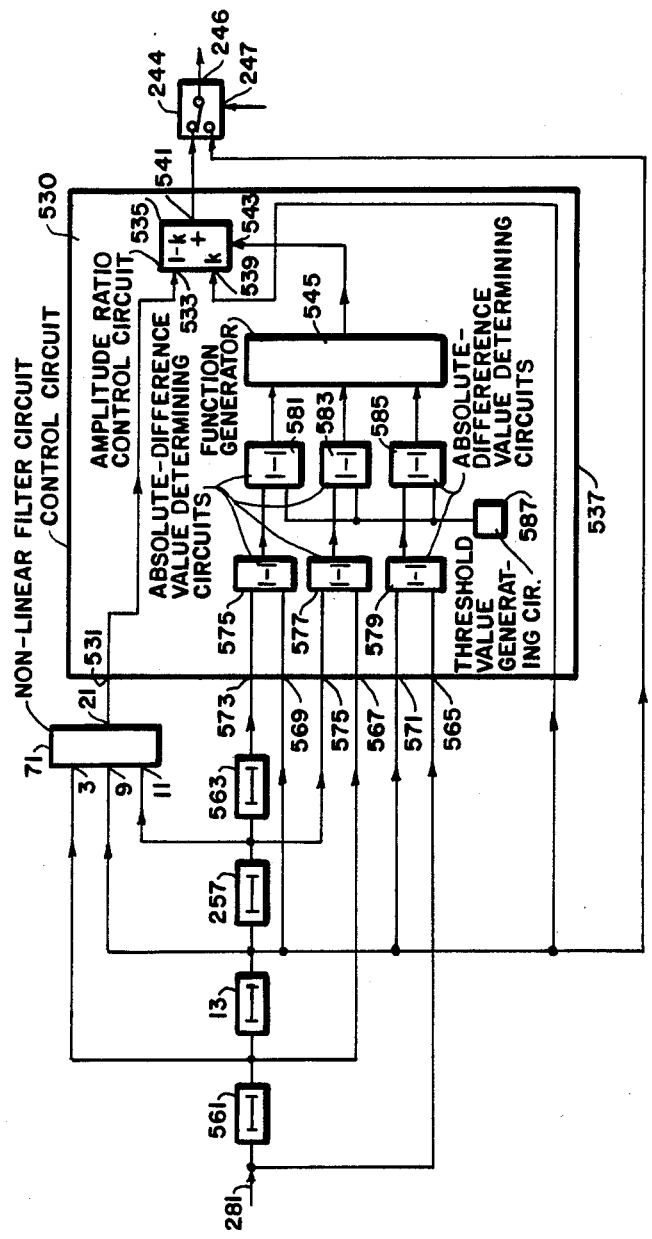
FIG. 20 illustrates with a block diagram a video signal processing circuit according to the invention including a different possible embodiment of a control circuit arranged between the output and the input circuit, of a non-linear filter circuit

In FIG. 20, in which components corresponding to those of the preceding pictures have been given the same reference numerals, it is shown how the control signal-producing portion of the control circuit 530 of FIG. 19 can be structured in a different manner.

To that end, delay circuits 561 and 563, respectively, producing a delay equal to one line period, are arranged between the output 281 of the line doubler circuit 263 and the input of the delay circuit 13 and after the output of the delay circuit 257.

Inputs 565 and 567, 569, respectively and 571, 573, 575 of the control circuit 530 are connected to, respectively, the output 281 of the line number doubler and the output of the respective delay circuits 561, 13, 157, 563. The inputs 573, 569 and 575, 567 and 571, 575, respectively of the control circuit 530 are connected to the inputs of an absolute-difference value determining circuit 575 and 577, 579, respectively, whose outputs are connected to an input of respective absolute-difference value determining circuits 581, 583 and 585, whose further inputs are connected to an output of a threshold value generating circuit 587. The output of the absolute-difference determining circuits 581, 583, 585 are connected to inputs of the function generator 545.

Video signals obtained from five directly superjacent lines of two fields are now present at the output 281 of the line doubler 263 and at the outputs of the delay circuits 561, 13, 257, 563. Frequencies having numbers of periods in the region of one third of the number of picture lines per picture height can now be detected with the aid of the absolute-difference value determining circuits 575, 577, 579, 581, 583, 585 and the function generator 545. When these frequencies are indeed present, then the non-linear filter 71 is switched-off by the amplitude ratio control circuit 535, as described with reference to FIG. 19.

These frequencies are present when continuously at least two of the output voltages of the absolute difference value determining circuits 575, 577, 579 exceed the threshold value applied to the absolute-difference value determining circuits 581, 583, 585.

Also, here it holds that the use in other video signal processing circuits including a non-linear filter is possible when video signals from five directly superjacent lines of two fields are applied to the inputs of the absolute-difference value determining circuits and video signals from the three center lines of these lines are applied to the non-linear filter circuit 71.

Figure 21:
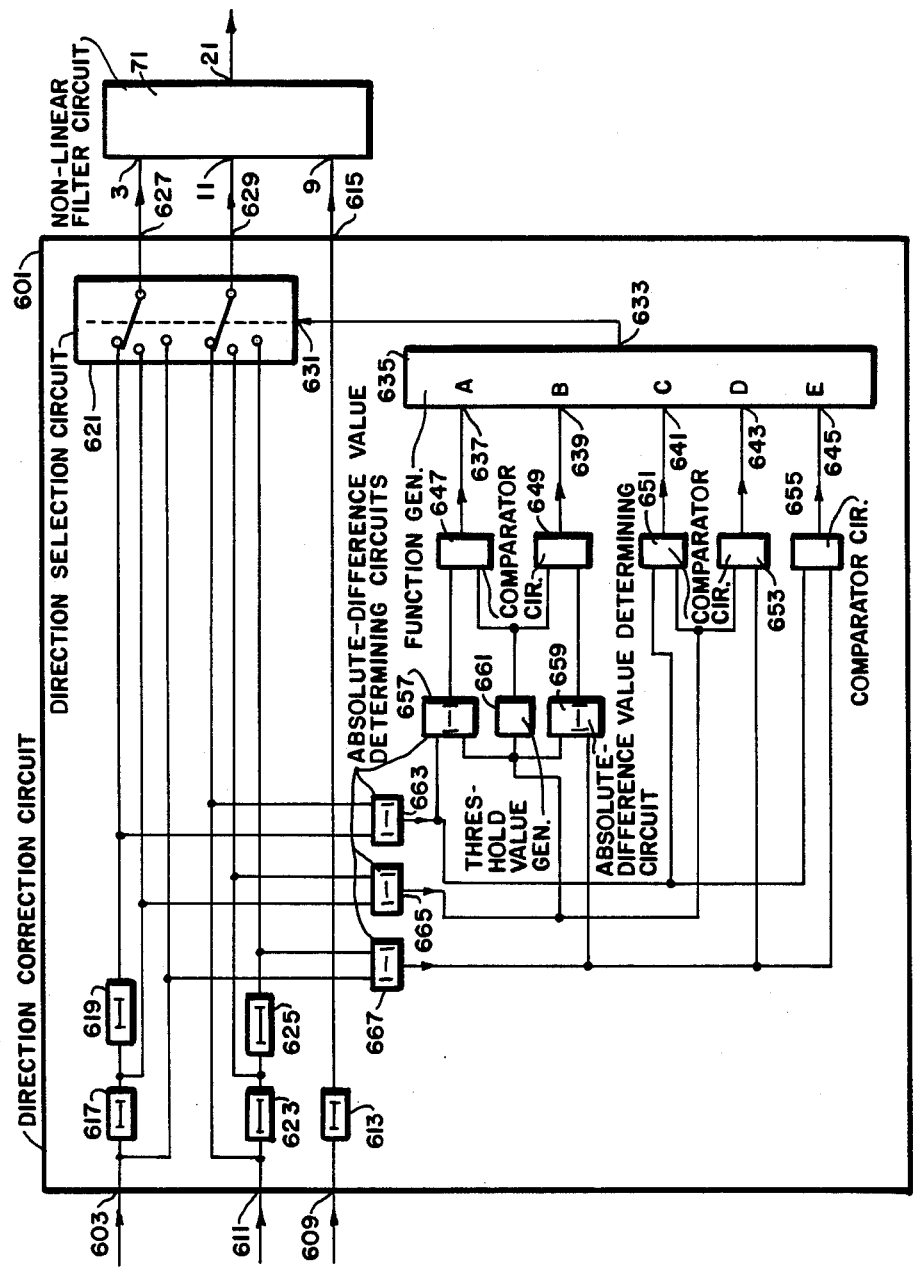
FIG. 21 illustrates with a block diagram a video signal processing circuit according to the invention, including a direction correction circuit preceding the input circuit of a non-liner filter circuit.

In FIG. 21, in which components corresponding to those of preceding picture have been given the same reference numerals, the non-linear filter circuit 71 is preceded by a direction correction circuit 601.

Three inputs 603, 609, 611 of this correction circuit receive video signals which correspond to three vertically in-line picture elements of three position-sequential lines from two consecutive interlaced fields of a picture to be displayed. The video signal corresponding to the central picture element is, for example, applied to the input 609 and via a delay circuit 613 producing a time delay corresponding, for example, to the duration of a picture element and an output 615 of the direction correction circuit 601 to the input 9 of the non-linear circuit 71.

The input 603 of the direction correction circuit 601 is connected to a series arrangement of two delay circuits 617, 618, each producing the same time delay as the delay circuit 613, and to the lowest of three inputs of the upper change-over switch of a direction selection circuit 621. The upper and central input, respectively of these three inputs is connected to the output of the delay circuit 619 and 617, respectively.

The input 611 of the direction correction circuit 601 is connected to a series arrangement of two delay circuits 623, 625 which each also produce the same time delay as the delay circuit 613, and to the highest input of the three inputs of the lower change-over switch of the direction selection circuit 621. The lowest and central input, respectively of these three inputs is connected to the output of the respective delay circuits 625 and 623.

The output of the highest and lowest change-over switch, respectively of the direction selection switch 621 is connected to the input 3 and 11, respectively of the non-linear filter circuit via an output 627 and 629, respectively of the direction correction circuit 601. It will be obvious that the direction selection circuit 621 is an electronic circuit. It is operated by a direction selection signal combination applied to its input combination 631 and received from an output combination 633 of a function generator 635 which is in the form of, for example, a programmable read-only memory (PROM).

The function generator 635 has five inputs 637 and 639, 641, 643, 645, respectively, which are connected to an output of the respective comparator circuits 647 and 649, 651, 653, 655. The comparator circuit 647 and 649, respectively compares the signal value produced by an absolute-difference value determining circuit 657 and 659, respectively to a threshold value received from a threshold value generator 661.

An input of the absolute-difference value determining circuit 647 and 649, respectively is connected to the output of an absolute-difference value determining circuit 663, 665. A further input of the absolute-difference value determining circuit 657 and 659, respectively is connected to the output of an absolute-difference value determining circuit 665 and 667, respectively. The output of the absolute-difference value determining circuit 663 is further connected to an input of the comparator circuits 651 and 655, the output of the absolute-difference determining circuit 665 to an input of the comparator circuits 651 and 653 and the output of the absolute-difference value determining circuit 667 to an input of the comparator circuits 653 and 655.

If the upper, the central and the lower position, respectively of the direction selection circuit 621 is denoted I, II and III, respectively, and the signals at the respective inputs 637 and 639, 641, 643 and 645 of the function generator 635 are denoted A and B, C, D, E, respectively, then the following Table holds for the positions I and III. In all the other cases the position II is assumed.

| A | B | C | D | E | position 621 |
|---|---|---|---|---|---|
| 0 | 0 | 0 | 0 | 0 | III |
| 0 | 0 | 0 | 0 | 1 | I |
| 0 | 0 | 0 | 1 | 1 | I |
| 0 | 0 | 1 | 0 | 0 | III |
| 0 | 1 | 0 | 0 | 0 | III |
| 0 | 1 | 0 | 0 | 1 | I |
| 0 | 1 | 0 | 1 | 1 | I |
| 0 | 1 | 1 | 0 | 0 | III |
| 1 | 0 | 0 | 0 | 0 | III |
| 1 | 0 | 0 | 0 | 1 | I |
| 1 | 0 | 0 | 1 | 1 | I |
| 1 | 0 | 1 | 0 | 0 | III |

In this situation it is assumed that C and D, E, respectively, have logic one values when the output value of the circuit 663 exceeds the output value of the circuit 665, the output value of circuit 667 exceeds that of the circuit 665 and the output value of the circuit 667 exceeds that of the circuit 663, respectively.

This implies that the non-linear filter circuit 71 receives video signals from picture elements which, depending on the direction of a contour, are on top of each other in a direction corresponding to the direction of that contour as a result of which an improved noise suppression by the non-linear filter circuit 71 is obtained.

The direction correction circuit can be used in all the described cases, but the delay equal to one picture element this correction circuit produces, must be taken account of. With the exception of the delay circuits, all the further circuits connected to the inputs 3, 9 and 11 of the non-linear circuits then remain connected thereto.

If so desired, the direction correction circuit 601 can be extended such that in the signal paths from the inputs 603 and 611 to the direction selection circuit 621 and the function generator 635 video signals corresponding to more picture elements can be used for selecting more contour directions.

What is claimed:

1. A video signal processing circuit (71) for processing an interlaced video signal, comprising a motion-adaptive selection circuit operable by means of a decision circuit, which selection circuit has three inputs (3, 9, 11) coupled to a video signal source for applying video signals thereto substantially corresponding to three position-sequential lines of two fields, and an output characterized in that the decision circuit (29) has three inputs (51, 53, 57) each being coupled to an input (3, 9, or 11) of the selection circuit (5) and is arranged for determining at any moment at which input (3, 9, or 11) of the selection circuit (5) the amplitude of the video signal applied thereto is closest to the mean value of the amplitudes of the three inputs (3, 9 or 11), and which the selection circuit (5) includes a circuit (15, 17, 19) for coupling said input (3, 9 or 11) to its output (21) under the influence of the decision circuit (29).

2. A video signal processing circuit (75) as claimed in claim 1, characterized in that it includes a comb filter circuit (77) for applying video signals to the inputs (3, 9, 11) of the selection circuit (5) being comb-filtered in such a manner that signal components having a periodicity in the vertical direction corresponding to three picture lines are suppressed therein, when corresponding to two picture lines, are passed when corresponding to more than four picture lines are likewise passed and that signal transients substantially do not show ringing in the vertical direction.

3. A video signal processing circuit as claimed in claim 1, characterized in that the decision circuit (29) includes three comparison circuits (45, 47, 49), each having an input pair (51, 53; 55, 57; 59, 61) which is coupled to an other pair of the inputs (3, 9, 11) of the selection circuit (5) and whose outputs are coupled to an address input combination (39, 41, 43) of a read-only memory (37), and the read-only memory has an output combination (31, 33, 35) which is coupled to an operation signal input combination (23, 25, 27) of the selection circuit (5).

4. A video signal processing circuit as claimed in claim 1, 2 or 3, characterized in that is includes a line number doubling circuit (223), one input (221) of which is coupled at least through the selection circuit (21), and another input (225) is coupled through a delay circuit (219, 226; 95, 27, 83) to the video signal source (1).

5. A video signal processing circuit as claimed in claim 1, 2 or 3, characterized in that the video signal processing circuit includes a line number doubling circuit (223), one input (221) of which is connected at least through a delay circuit (253) having a delay of one field period, plus half a line period and another input (225) of which is directly coupled to the video signal source (1).

6. A video signal processing circuit as claimed in claim 1, 2 or 3, characterized in that it includes a line number doubler (263) having three line memories (269, 271, 273) with writing cycles partially overlapping each other.

7. A video signal processing circuit as claimed in claim 1, 2 or 3, characterized in that the video signal source includes a field number doubler (283) of the A, A, B, B, type, A and B representing consecutive fields in a video signal.

8. A video signal processing circuit as claimed in claim 1, characterized in that it is a recursive noise reduction circuit having a feedback path (321, 319, 305) incorporating the selection circuit (3, 9, 11, 71, 21).

9. A video signal processing circuit as claimed in claim 1, characterized in that it is a DPCM decoder (331), an input (333) of which is coupled to an input (349) of an adder circuit (437), a further input (345) of which is connected through a delay circuit (71, 355, 353, 351) to an output (349) of the adder circuit (347), and which delay circuit includes the selection circuit (5, 71).

10. A video signal processing circuit as claimed in claim 1, characterized in that an output (21) of the selection circuit (5) is coupled to an input (363) of an adder and subtractor circuit (365) forming a vertical contour correction signal and to a further input (369) thereof through a delay circuit (367) having a delay of one line period, said adder and subtractor circuit having a third input (371) which is coupled to an input (9) of the selection circuit (5).

11. A video signal processing circuit as claimed in claim 2, characterized in that the comb filter circuit (75) has two outputs (181, 183) which through a delay circuit (385) and directly with a delay of one line period with respect to each other, can apply comb-filtered signals to two inputs (371, 363, respectively) of an adder and subtractor circuit (365), a third input (369) of which is coupled through a delay circuit (367) having a delay of one line period to one of the said outputs (183) of the comb filter circuit (75), said adder and subtractor circuit (365) being able to supply a contour correction signal.

12. A video signal processing circuit as claimed in claim 1, 2 or 3, characterized in that it includes a line number halving circuit (417) which is coupled at least through an interpolation circuit (405) to the selection circuit (5 in 71 or 75).

13. A video signal processing circuit as claimed in claim 1, characterized in that connected to the output (21) of the selection circuit is an input (501) of a subtracting circuit (503), a further input (505) of which is connected to the input (11) of the decision circuit to which a video signal from a previous field is applied so that at an output (507) of the subtracting circuit (503), a movement indication signal is obtained.

14. A video signal processing circuit as claimed in claim 1, characterized in that it includes a line number doubler circuit whose output circuit (281) is coupled to the input circuit (3, 9, 11) of the decision and selection circuit (71) serving as a non-linear filter circuit, and in that the output (21) and an input (9) of the decision and selection circuit (71) are coupled to the inputs of a change-over switch (244) via a complementary comb filter circuit (517).

15. A video signal processing circuit as claimed in claim 1, characterized in that it includes a control circuit (530) coupled to the output (21) and to the input circuit (3, 9, 11) of the decision and selection circuit (71) serving as a non-linear filter circuit.

16. A video signal processing circuit as claimed in any one of claims 1–3, 8–11, or 13–15, characterized in that a direction correction circuit (601) is coupled to the input circuit (3, 9, 11) of the decision and selection circuit (71) which serves as a non-linear filter circuit.

* * * * *